US012649387B2

(12) United States Patent
Schwartz

(10) Patent No.: US 12,649,387 B2
(45) Date of Patent: Jun. 9, 2026

(54) METHOD FOR CHARGING A VEHICLE AT A FAST-CHARGING STATION AND A CORRESPONDING VEHICLE

(71) Applicant: Dr. Ing. h. c. F. Porsche AG, Stuttgart (DE)

(72) Inventor: Luke Schwartz, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 18 days.

(21) Appl. No.: 18/765,560

(22) Filed: Jul. 8, 2024

(65) Prior Publication Data

US 2025/0026240 A1     Jan. 23, 2025

(30) Foreign Application Priority Data

Jul. 18, 2023     (DE) .......................... 102023118938.7

(51) Int. Cl.
B60L 58/26       (2019.01)
B60K 11/02       (2006.01)
H01M 10/44       (2006.01)
H01M 10/613      (2014.01)
H01M 10/625      (2014.01)
H01M 10/6568     (2014.01)

(52) U.S. Cl.
CPC ............. B60L 58/26 (2019.02); H01M 10/44 (2013.01); H01M 10/613 (2015.04); H01M 10/625 (2015.04); H01M 10/6568 (2015.04); B60K 11/02 (2013.01); H01M 2220/20 (2013.01)

(58) Field of Classification Search
CPC .... B60L 58/26; H01M 10/613; H01M 10/625
See application file for complete search history.

(56) References Cited

U.S. PATENT DOCUMENTS

| | | | | | |
|---|---|---|---|---|---|
| 5,283,573 | A | * | 2/1994 | Takatou | ................... G08G 1/04 |
| | | | | | 346/107.2 |
| 10,144,295 | B2 | | 12/2018 | Ghebru | |
| 11,004,436 | B2 | | 5/2021 | Heyne | |
| 11,814,034 | B2 | | 11/2023 | Fuchs | |

(Continued)

FOREIGN PATENT DOCUMENTS

| | | | |
|---|---|---|---|
| DE | 10 2018 204 992 | 10/2019 | |
| DE | 102018204992 A1 * | 10/2019 | ................ B60L 1/02 |

(Continued)

*Primary Examiner* — Scott A Browne
*Assistant Examiner* — Josephine Elizabeth Rich
(74) *Attorney, Agent, or Firm* — Buchanan Ingersoll & Rooney PC

(57)     ABSTRACT

A method is provided for charging a vehicle (10) with high-voltage components (11) at a fast-charging station (20). The method includes ascertaining a prevailing noise level around the vehicle (10) while operating noise (21) produced by the vehicle (10) itself during charging is suppressed. The method continues by determining a volume of the operating noise (21) that is tolerable for the driver (22) and bystanders (23) depending on the noise level and a measured distance of a vehicle key (24) from the vehicle (10). The method proceeds by cooling the high-voltage components (11) of the vehicle (10) that are heated by charging so that the operating noise (21) caused by the cooling is limited to the tolerable volume.

12 Claims, 1 Drawing Sheet

(56)          References Cited

U.S. PATENT DOCUMENTS

2016/0141645 A1 *   5/2016   Yamada ............ H01M 8/04619
                                                 429/436
2019/0385447 A1 *  12/2019   Marecek .................. G08G 1/04
2020/0243924 A1 *   7/2020   Kinoshita ............. H01M 10/63
2021/0237712 A1 *   8/2021   Fuchs .............. H01M 10/6563

FOREIGN PATENT DOCUMENTS

DE        10 2018 206 812        11/2019
DE          102018206812 A1 *  11/2019   ....... G10K 11/17813
DE        10 2018 209 072        12/2019
DE        10 2020 123 469         3/2022
DE        10 2021 200 997         8/2022
DE        10 2021 205 697        10/2022
DE          10 2021205554        12/2022

* cited by examiner

METHOD FOR CHARGING A VEHICLE AT A FAST-CHARGING STATION AND A CORRESPONDING VEHICLE

CROSS-REFERENCE TO RELATED APPLICATION

This application claims priority on German Patent Application No 10 2023 118 938.7 filed Jul. 18, 2023, the entire disclosure of which is incorporated herein by reference.

FIELD OF THE INVENTION

The invention relates to a method for charging a vehicle at a fast-charging station. The invention also relates to a corresponding vehicle, a corresponding computer program, and a corresponding storage medium.

BACKGROUND OF THE INVENTION

Electric vehicles have become widely used in the last decade due to their environmentally friendly properties and improved technologies. However, charging time is a well-known problem in the industry and is a recurring issue when using electric vehicles. Despite significant improvements in battery technology, charging electric vehicles remains time-consuming, particularly when compared to refueling gasoline or diesel vehicles.

Fast charging systems have been developed to solve this problem. These systems use high charging powers to shorten the charging time and increase customer acceptance of electric vehicles. However, high charging currents create a significant loss of energy in the form of heat. This heat can heat the high-voltage components of the vehicle to a temperature that requires the components to be throttled to avoid further overheating and potential damage (derating).

Cooling systems are used to avoid thermal derating and accelerate the charging process. The typical cooling system has a cooling fan and a coolant circuit that thermally connects the high-voltage components of the vehicle to a heat dissipation device, such as a radiator or condenser. Increasing the speed of the cooling fan can increase heat dissipation and thus can accelerate charging.

Modern vehicles often are equipped with sensors, such as cameras for driving assistance systems and microphones for voice-controlled systems. Modern vehicles also have keyless entry systems in which a key fob or a remote control communicates with the vehicle. This communication makes it possible for the vehicle to determine whether the key is nearby and whether the vehicle should be unlocked or locked.

DE102018206812A1 discloses a method for regulating the noise level during a charging process of a battery-electric motor vehicle. The method uses vehicle sensors to register traffic and/or noise load in the environment. The sensors are embodied as cameras. Counter-noise is generated based on the registered loads and can reduce a noise emission of the charging process. The noise load in the environment can be isolated from the noise level of the charging process by means of noise suppression. In one embodiment, the noise level is adjusted based on the distance of people to the vehicle.

U.S. Pat. No. 10,144,295 discloses a method for regulating the noise level during a charging process of a battery-electric motor vehicle. The method uses noise emission position data to determine maximum loads in the environment and then adjusts noise emission of the charging process by reducing the fan and/or air conditioning system of the motor vehicle.

U.S. Pat. No. 11,004,436 discloses a method for regulating the noise level during a charging process of a battery-electric motor vehicle, in which a noise load in the environment is registered by sensors of a sound recording device. A counter noise is produced based on the registered loads and can by eliminate noise from the charging process thereby reducing the overall noise. The sensors are embodied as microphones and are disposed externally on the vehicle.

DE102021205697B3 discloses a method for regulating the noise level during the charging process of a battery-electric motor vehicle. The method uses microphones as noises sensors to register a noise load in the environment caused by fan noises. The fan speed of the charging process can be adjusted based on the registered loads.

DE102021200997A1 discloses a method for regulating the charging noise level during a charging process of a battery-electric motor vehicle. The method uses microphones as sensors to register ambient noises. The vehicle's own fan and/or refrigerant compressor can be reduced based on the registered loads to reduce a noise emission of the charging process.

DE102021205554A1 discloses a method for regulating noise emission during a charging process of a battery-electric motor vehicle. The method uses microphones as sensors to register a noise load in the environment. Based on the registered loads, a noise emission of the charging process can be adjusted by reducing the vehicle's own fan and/or refrigerant compressor.

DE102018209072A1 discloses a method for regulating the noise level during a charging process of a battery-electric motor vehicle. The method uses microphones as sensors to register ambient noises. A noise emission of the charging process can be adjusted by reducing the fan speed or by reducing the compressor power of the cooling system.

Fast charging of electric vehicles is associated with significant heat generation that has to be managed by activating cooling systems of the above-described types. However, these cooling systems produce an operating noise that can be perceived as annoying, in particular at high fan speeds. This is the case particularly in quiet surroundings, in which the operating noise of the vehicle can significantly exceed the ambient noise level.

This problem is exacerbated by the fact that acoustic comfort has become an important aspect of the user experience in the automotive industry. As the number of electric vehicles and the need for fast charging stations in urban and quiet areas increases, the operating noise of a vehicle during charging is becoming a more relevant issue.

Another problem is that conventional approaches to reducing operating noise during the charging process, such as throttling the cooling system, often come at the expense of charging speed. Such throttling can result in insufficient cooling of the vehicle components, which in turn causes a throttling of the charging power and an increase in the charging time.

It is therefore an ongoing challenge to find a compromise between fast charging and low noise levels.

SUMMARY OF THE INVENTION

The invention relates to optimizing an interplay between the charging process and operating noise emissions by using an intelligent combination and use of sensors that may already be present in some vehicles. The method includes ascertaining the ambient noise level in a variety of ways; for example, by using cameras to acquire the traffic volume and/or microphones to measure the ambient noise directly. This approach goes beyond conventional noise regulation by taking into account the noise level in the environment, but also a distance of the vehicle key from the vehicle when setting the permissible noise level. This enables personalized and situation-adapted noise control that provides significant added value for the driver. For example, if the vehicle key is far away from the vehicle, the vehicle can emit a higher noise level without bothering the driver so that the charging process can be faster.

The invention also enables an efficient cooling solution that ensures adequate cooling of the high-voltage components without the operating noise of the vehicle exceeding the permissible volume. This protects the high-voltage components of the vehicle from overheating without unnecessarily increasing the charging time.

Thus, the invention combines the benefits of fast charging with improved acoustic comfort, both for the driver and for bystanders, while making efficient use of resources already available in the vehicle. This contributes significantly to an improved user experience and could increase acceptance of electric vehicles.

DETAILED DESCRIPTION

Figures 1, 2:
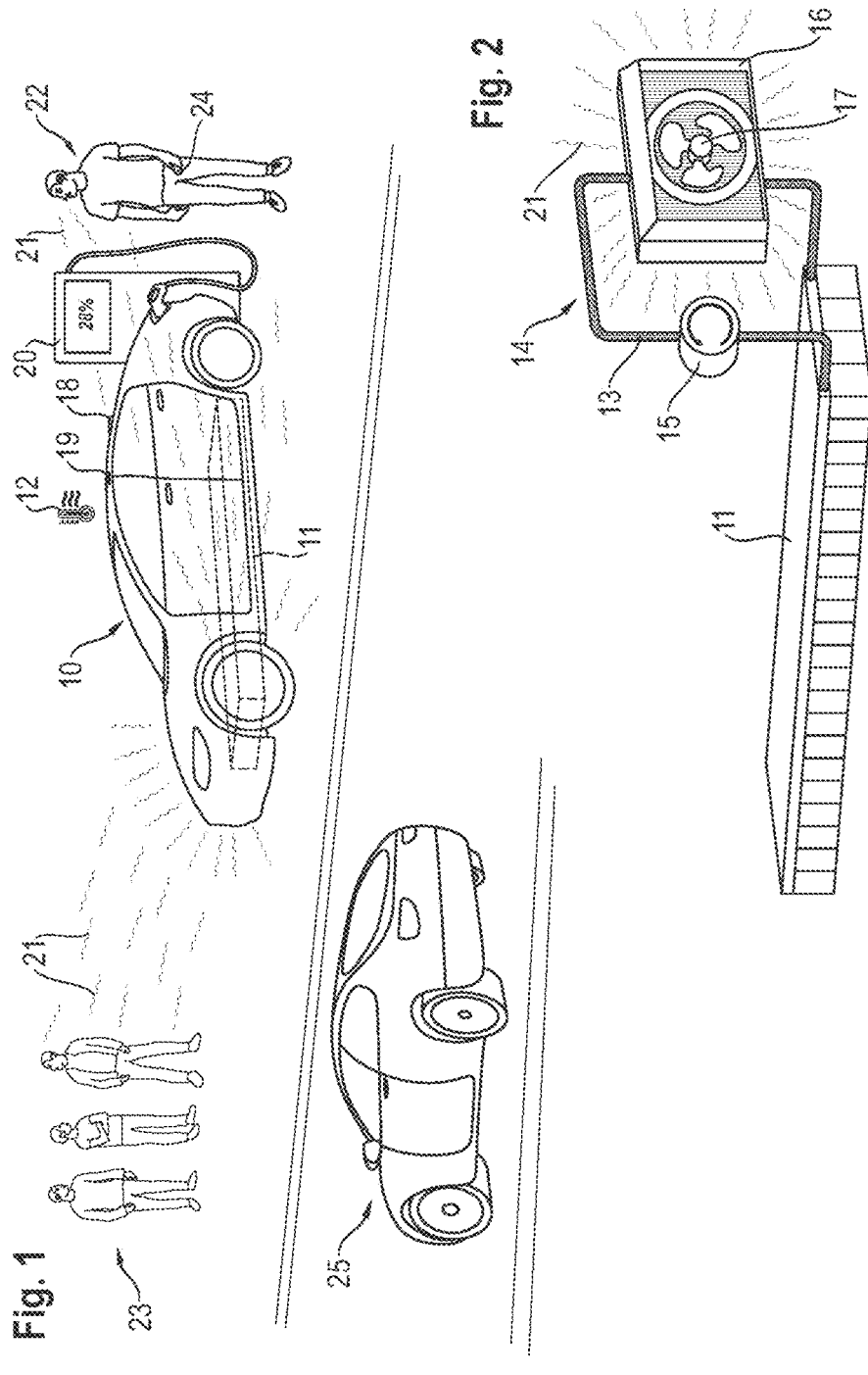
FIG. 1 shows a battery-electric vehicle charging at a fast-charging station.
FIG. 2 shows the cooling of the vehicle.

FIG. 1 illustrates a battery-electric vehicle 10 that is being charged at a fast-charging station 20. The vehicle 10 has a high-voltage battery that is heated during charging. The high-voltage battery and other high-voltage components 11 are designed for a specific operating temperature 12, above which the charging power has to be reduced to prevent overheating but thereby extending the charging time.

To dissipate heat, the vehicle 10 is equipped with a coolant circuit 14, as shown in FIG. 2. The coolant circuit has a coolant pump 15 that conveys coolant 13. In the case of a refrigerant circuit, a compressor is provided instead of the coolant pump 15. The coolant circuit 14 connects the high-voltage components 11 to the radiator fan 17 in the conventional manner via a heat exchanger 16. A further refrigerant cooling circuit can be connected to the coolant circuit via a heat exchanger as well. If the coolant pump 15 and the radiator fan 17 operate at higher speeds, the thermal dissipation rate increases and enables faster charging. However, this also leads to increased operating noise 21, which can be perceived as annoying by both the driver 22 and bystanders 23.

The vehicle 10 uses a variety of sensor systems to limit the noise level. A camera 18 is mounted on the vehicle 10 to assist the driver 22 when parking. The camera 18 can be used to acquire the traffic volume 25 symbolized by the vehicle in the vicinity of the vehicle 10. Factors such as the number of traffic volume sources, their traffic density and speed, as well as the distance from the vehicle 10 are taken into account. Based on this assessment, the noise level in the surroundings of the vehicle 10 is estimated and the permissible operating noise 21 of the vehicle 10 is limited such that it exceeds the ambient noise level by only a specific amount.

The vehicle 10 also can be equipped with an external microphone 19 that measures the noise level in the surroundings of the vehicle 10 directly. The operating noise 21 produced by the vehicle 10 itself can be "factored out" of this measurement by means of acoustic noise suppression techniques and thus, as it were, hidden, because it should not be taken into account when ascertaining the noise level.

The distance of the vehicle key 24 from the vehicle 10 can also be used to determine the permissible noise levels. If the vehicle key 24 is beyond a certain distance from the vehicle 10, the permissible operating noise 21 can be increased because the driver 22 and other bystanders 23 are less likely to be bothered.

This regulation is accomplished by adjusting the speed of the coolant pump 15 and the radiator fan 17. Both the coolant pump 15 and the radiator fan 17 can be throttled as needed to limit the operating noise 21 to a tolerable level. This can be the case if the noise level in the surroundings is low, for example, and/or if the vehicle key 24 is located a short distance from the vehicle 10.

The coolant circuit 14, the sensor systems, the microphone 19 and the vehicle key 24 may communicate with a computer that may comprise one or more general-purpose processors (CPUs) or microprocessors, RISC processors, GPUs and/or DSPs. The computer has, for example, additional elements such as storage interfaces of the communication interfaces. Optionally or additionally, the terms refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub) computers that are interconnected and/or connected and/or otherwise communicatively connected and possibly share one or more other resources, such as for example a memory.

The computer may have a memory such as a hard disk (HDD) or a (nonvolatile) solid state memory, for example a ROM store or flash memory [flash EEPROM]. The memory often comprises a plurality of individual physical units or is distributed over a multiplicity of separate devices, as a result of which access thereto takes place via data communication, for example package data service

| List of reference signs | |
|---|---|
| Reference sign | Description |
| 10 | Vehicle |
| 11 | High-voltage components |
| 12 | Operating temperature |
| 13 | Coolant |
| 14 | Coolant circuit |
| 15 | Coolant pump |
| 16 | Heat exchanger |
| 17 | Radiator fan |
| 18 | Camera |
| 19 | External microphone |
| 20 | Fast charging station |
| 21 | Operating noise |
| 22 | Driver |
| 23 | Other bystanders |
| 24 | Vehicle key |
| 25 | Traffic volume |

The invention claimed is:

1. A method for charging a vehicle (10) with high-voltage components (11) at a fast-charging station (20), the method comprising:

ascertaining a prevailing noise level around the vehicle (10) while suppressing operating noise (21) produced by the vehicle (10) during charging, wherein ascertaining the prevailing noise level comprises (i) using an external microphone (19) of the vehicle (10) and acoustically suppressing the operating noise (21) at the external microphone (19) by filtering out the operating noise (21) and (ii) estimating a prevailing traffic volume (25) near the vehicle (10) using a camera (18) of the vehicle (10);

determining a tolerable volume of the operating noise (21) that is tolerable for the driver (22) and bystanders (23) based on the prevailing noise level and a measured distance of a vehicle key (24) from the vehicle (10); and cooling the high-voltage components (11) of the vehicle (10) heated by charging so that the operating noise (21) caused by the cooling does not exceed the tolerable volume.

2. The method of claim 1, wherein the cooling is carried out by conveying coolant (13) in a circuit (14) by a coolant pump (15), and the operating noise (21) is limited by throttling the coolant pump (15).

3. The method of claim 1, wherein the cooling is carried out by a heat exchanger (16) via a radiator fan (17), and the operating noise (21) is limited by throttling the radiator fan (17).

4. The method of claim 1, wherein the vehicle key (24) transmits radio signals and the distance is measured based on the radio signals received at the vehicle (10).

5. The method of claim 1, wherein the tolerable volume is set to exceed the prevailing noise level by no more than a specified amount.

6. The method of claim 5, wherein the tolerable volume is increased if the distance of the vehicle key (24) from the vehicle (10) exceeds a certain amount.

7. The method of claim 1, wherein the tolerable volume is increased if the distance of the vehicle key (24) from the vehicle (10) exceeds a certain amount.

8. A vehicle (10), comprises: high-voltage components (11) designed for a specific charging temperature (12) and the vehicle (10) is configured to carry out the method of claim 1.

9. A computer program configured to carry out the steps of the method of claim 8 stored on a non-transitory machine-readable storage medium.

10. The method of claim 1, wherein estimating the prevailing traffic volume (25) near the vehicle (10) using the camera (18) of the vehicle (10) comprises accounting for a number of vehicles, traffic density and vehicle speeds in the vicinity of the vehicle (10) using the camera (18) of the vehicle (10).

11. The method of claim 1, wherein the cooling is carried out by conveying coolant (13) in a circuit (14) by a coolant pump (15), the circuit (14) including a heat exchanger (16) that is cooled by a radiator fan (17), wherein the operating noise (21) is limited by throttling both the coolant pump (15) and the radiator fan (17).

12. The method of claim 11, wherein the coolant pump (15) and the radiator fan (17) are actively throttled as a function of the measured distance between the vehicle key (24) and the vehicle (10).

\* \* \* \* \*